United States Patent [19]
Ostby et al.

[11] 3,948,623
[45] Apr. 6, 1976

[54] HIGH TEMPERATURE AIR FILTRATION SYSTEM AND METHOD FOR FOUNDRIES

[76] Inventors: Donald H. Ostby, 838 E. Forest Ave., Muskegon, Mich. 49442; Joseph H. Smith, 6737 Old Channel Trail, Montague, Mich. 49437

[22] Filed: Dec. 20, 1974

[21] Appl. No.: 534,861

Related U.S. Application Data

[63] Continuation of Ser. No. 284,582, Aug. 29, 1972, abandoned.

[30] Foreign Application Priority Data

[52] U.S. Cl............55/96; 55/283, 55/284, 55/294, 55/302, 55/341, 55/379
[51] Int. Cl.²....................B01D 46/04
[58] Field of Search...55/96, 97, 283, 302, 294, 292, 55/378, 379, 242, 341, 291, 305, 55/271–273, 300, 284, 379

[56] References Cited
UNITED STATES PATENTS

| | | | |
|---|---|---|---|
| 1,413,126 | 4/1922 | McGee, et al. | 55/300 |
| 2,576,656 | 11/1951 | Wallin | 55/283 |
| 2,804,168 | 8/1957 | Church | 55/302 |
| 3,060,663 | 10/1962 | Morris, et al. | 55/302 |
| 3,146,080 | 8/1964 | Ruble, et al. | 55/379 |
| 3,633,757 | 1/1972 | Madern | 55/379 |
| 3,636,680 | 1/1972 | Seidel | 55/291 |
| 3,813,853 | 6/1974 | Anderson | 55/96 |

FOREIGN PATENTS OR APPLICATIONS

| | | | |
|---|---|---|---|
| 205,597 | 1/1957 | Canada | 55/302 |
| 401,186 | 8/1924 | Germany | 55/302 |
| 525,710 | 1/1954 | Belgium | 55/283 |
| 903,890 | 2/1954 | Germany | 55/291 |

*Primary Examiner*—Bernard Nozick
*Attorney, Agent, or Firm*—Mason, Fenwick & Lawrence

[57] ABSTRACT

An improved high temperature air-filtering system which removes the small suspended particles from effluent exhaust gases expelled by various sources of pollution including foundries and the like. The improved system includes a multiplicity of enclosed dual chambered filtering modules having parallel connected vertical cylindrical screen filter units, a gas inlet for connection with an exhaust conduit leading from a source of air pollution and connected in parallel with the dual chambers at the upper end, a hopper for collecting solids at the lower end, and a discharge conduit connected to an exhaust blower fan. Each cylindrical filter unit comprises a plurality of modular screen units formed of a desired number of relatively short cylindrical filter screens supported within open cylindrical frames. A unique detecting and valving control system is provided to enable clogged filter units to be selectively and automatically bypassed and cleaned in response to detection of a predetermined velocity drop through the filter medium. The filter units are cleaned by automatically operated cleaning manifolds which rotate within the filter unit to scan the full vertical length of the cylindrical screen units. A cleaning fluid such as air, steam or water under high pressure is directed into a central axial supply pipe and fed through lateral arms to a slot or spray nozzle in the cleaning manifold which is disposed to rotate close to the filter medium. The high pressure cleaning fluid is directed from the clean gas side of the filter into and through the accumulated residue on the outer side dislodging the residue on the outer side which falls by gravity into a lower hopper portion of the enclosed chamber where the residue is automatically discharged from the system.

28 Claims, 25 Drawing Figures

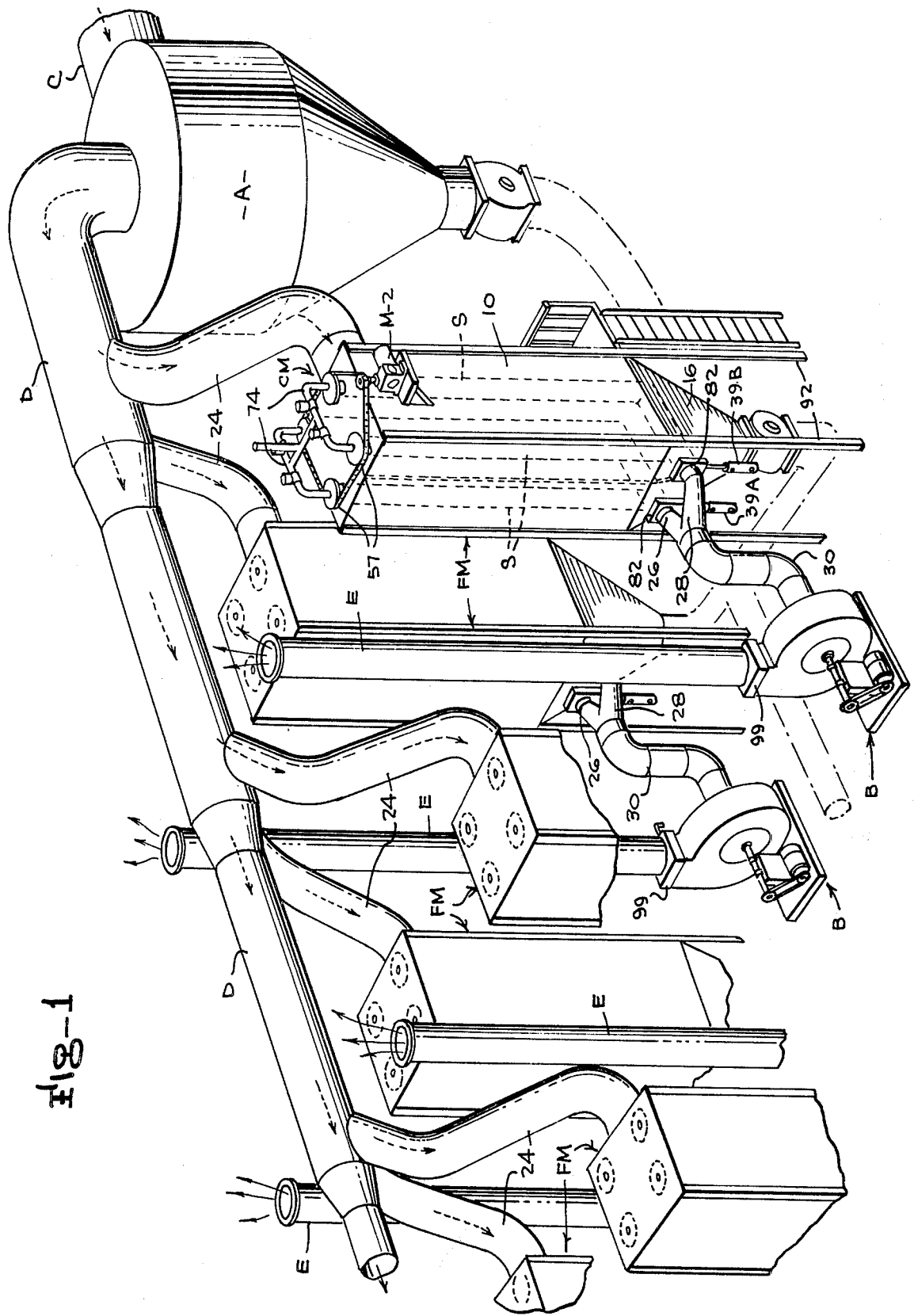

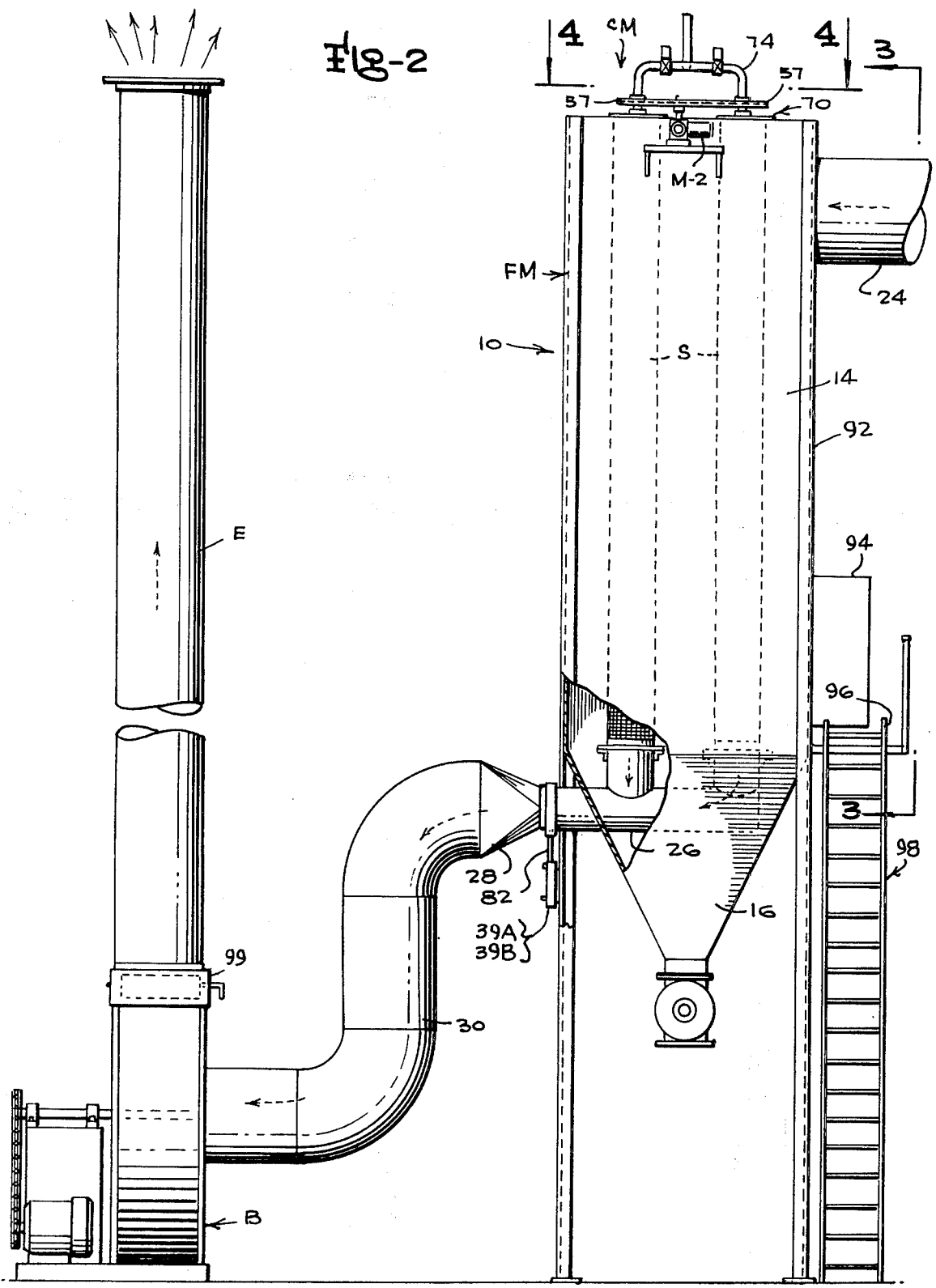

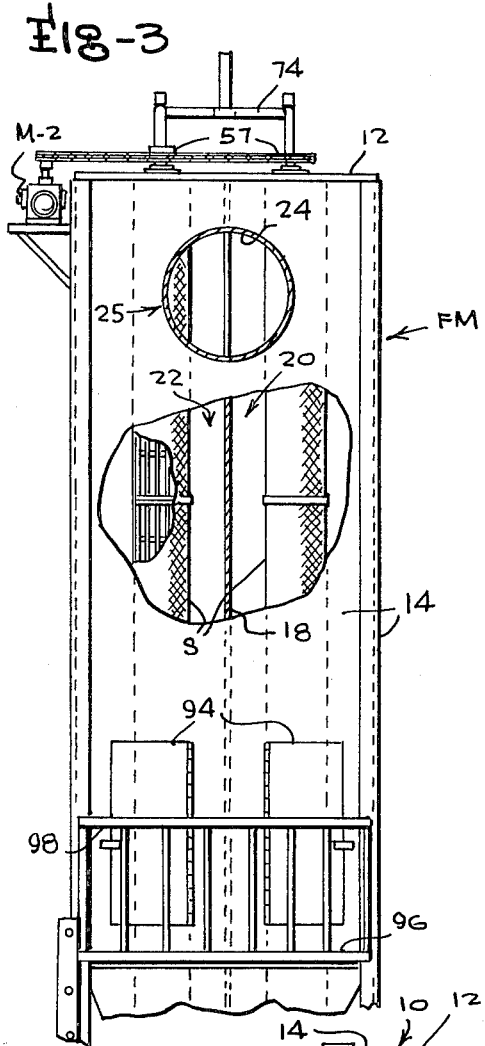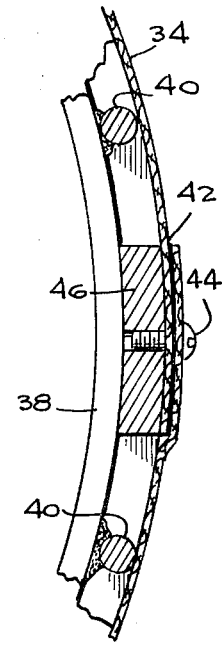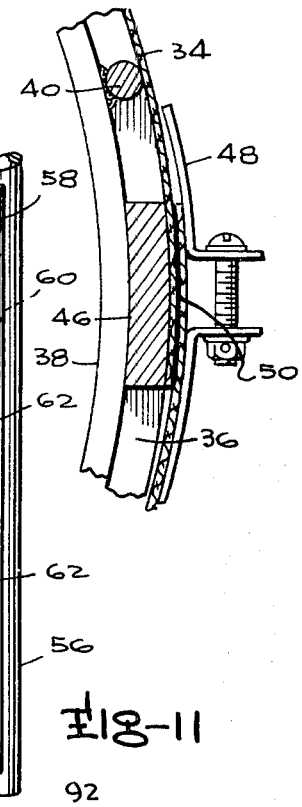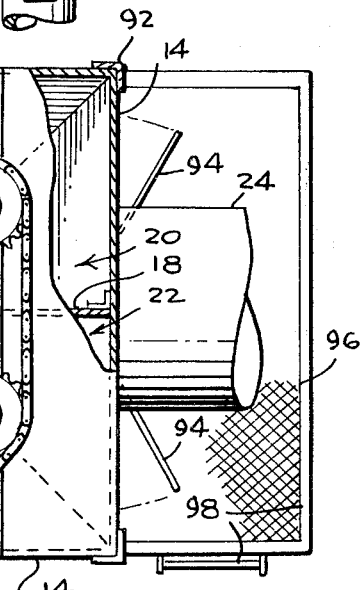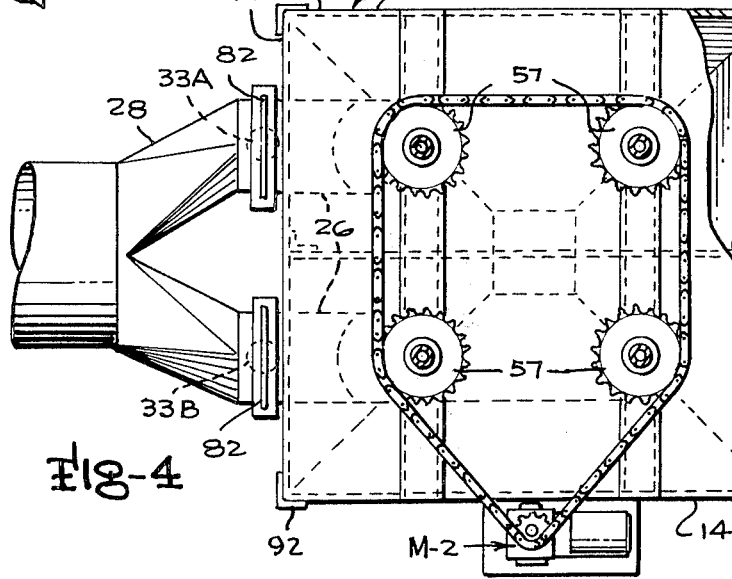

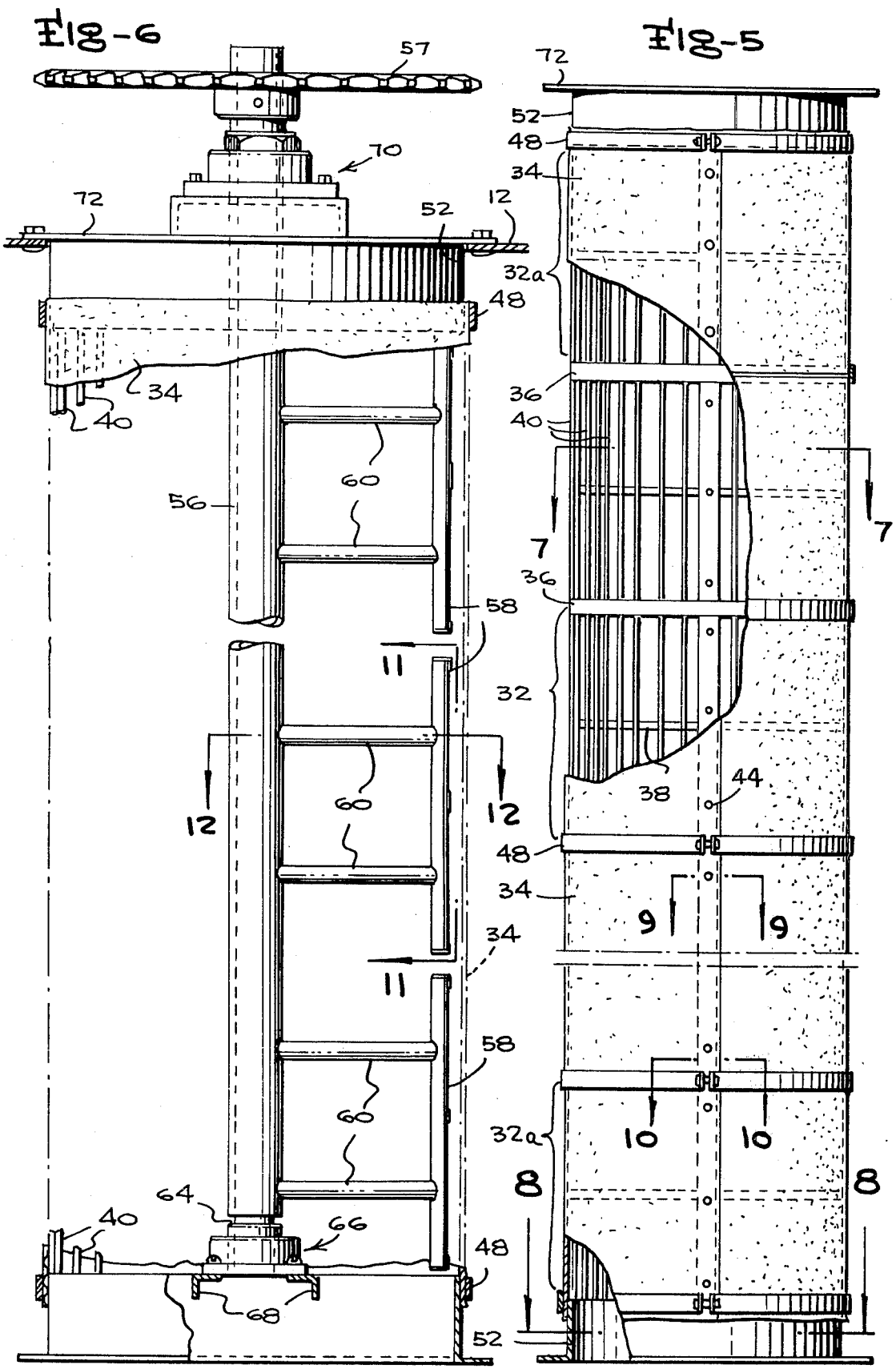

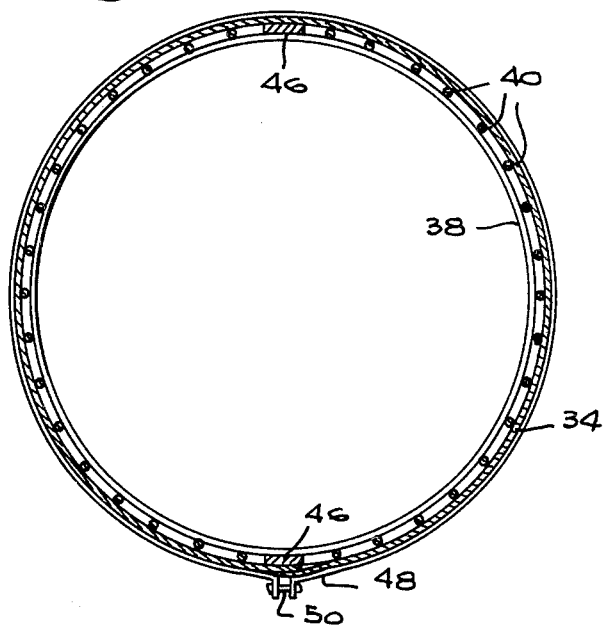
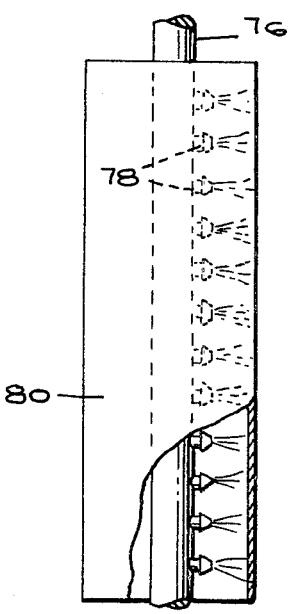
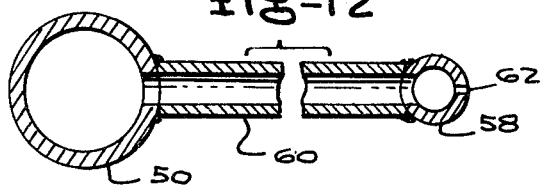
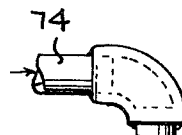
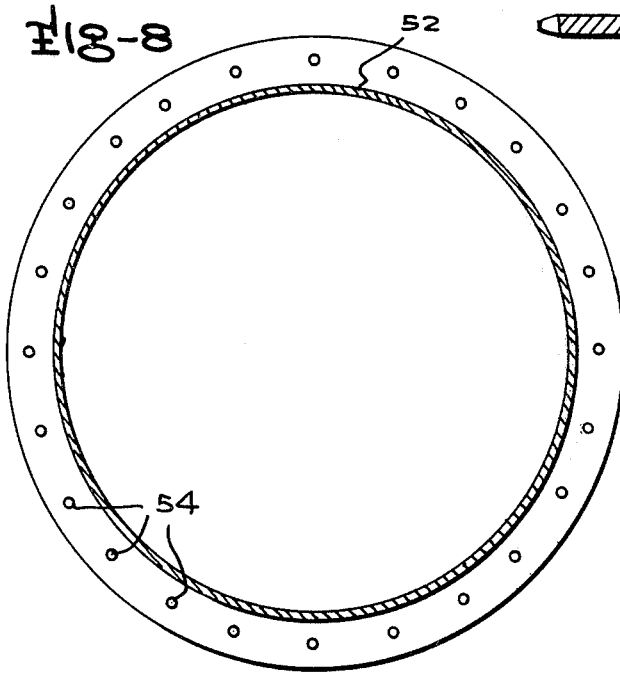

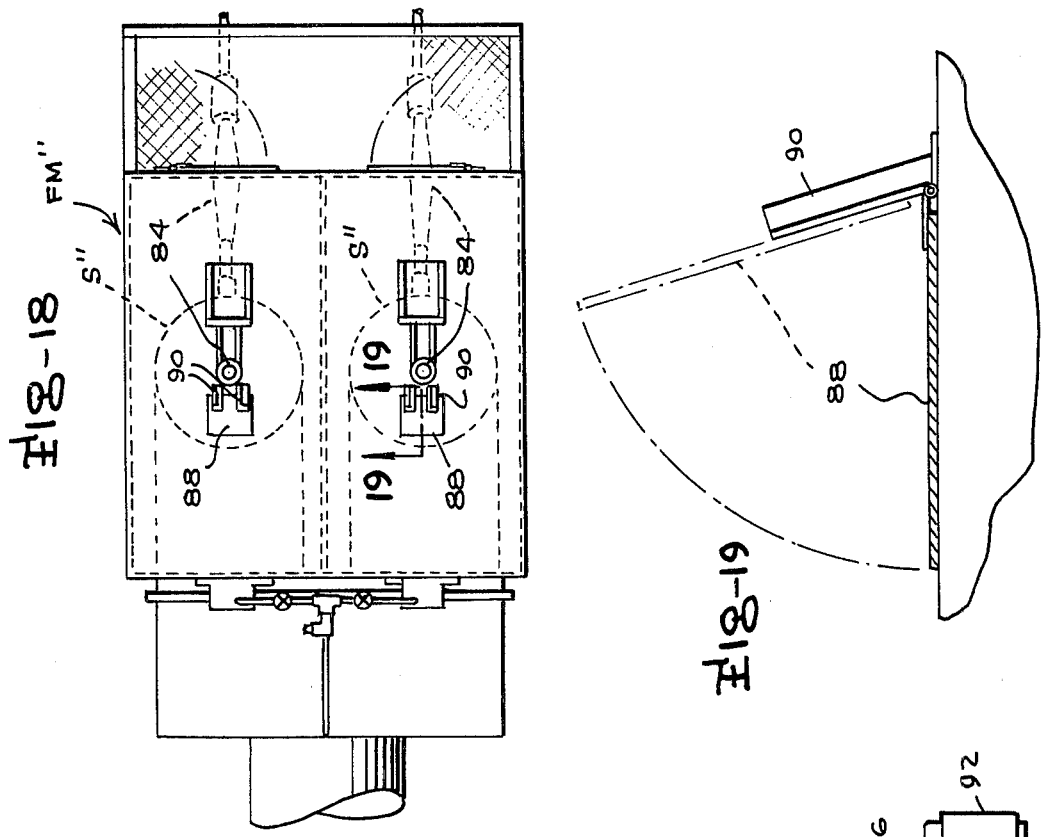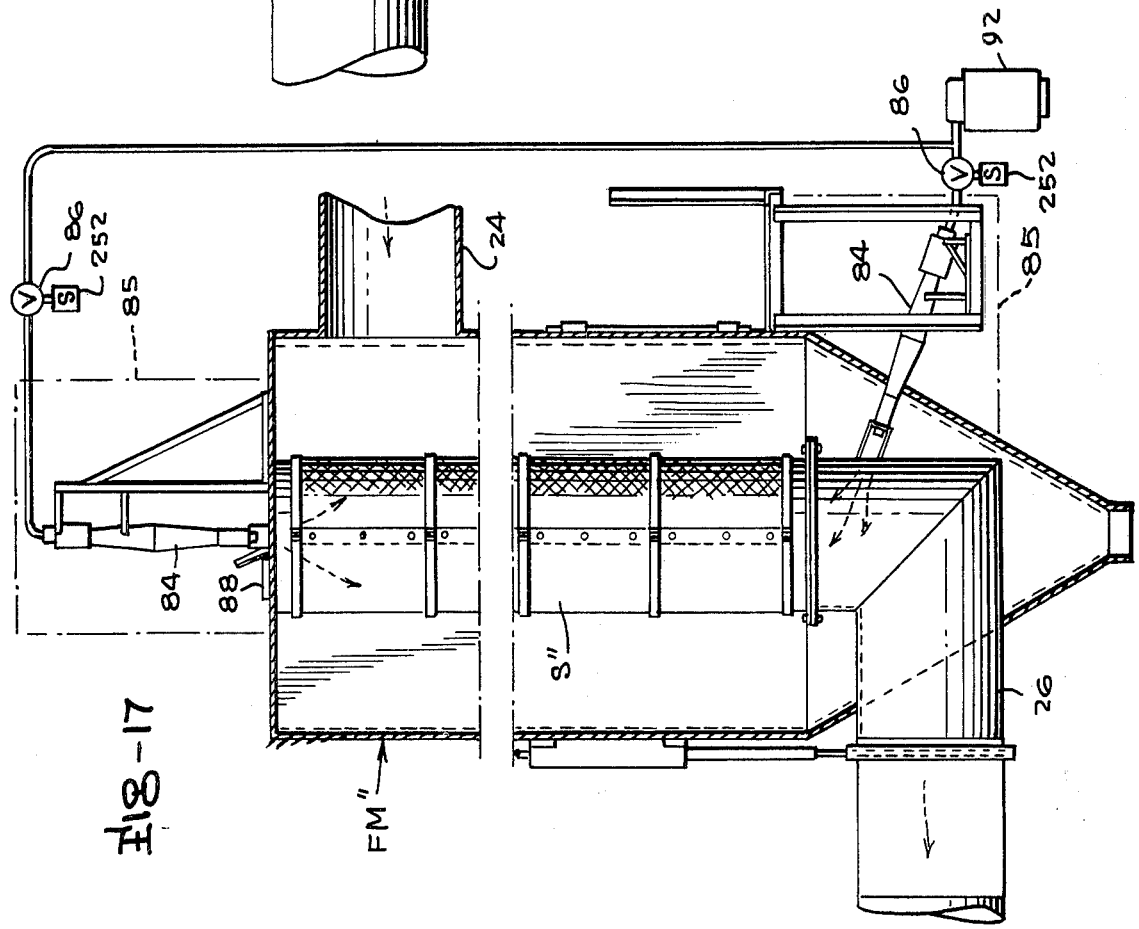

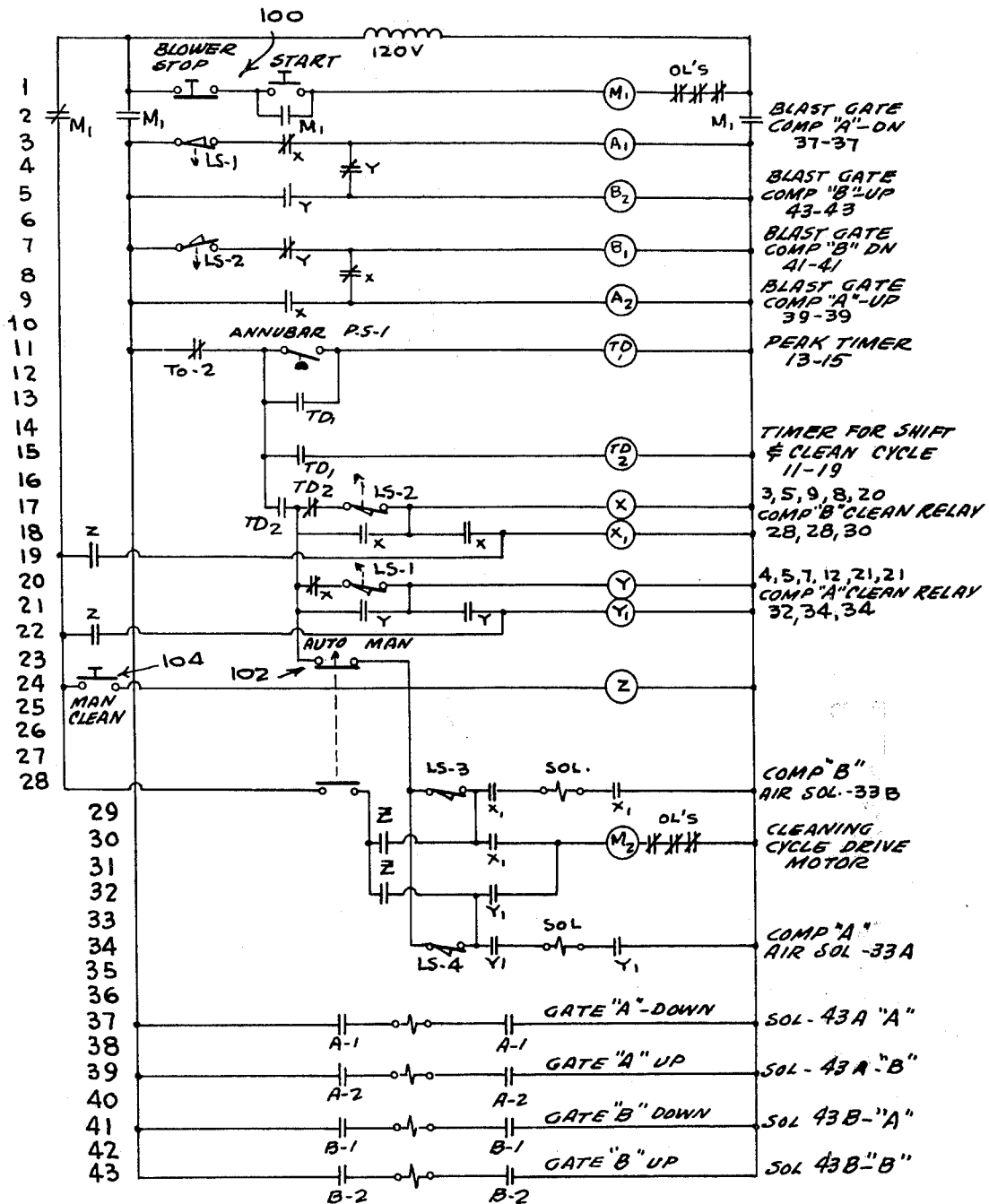

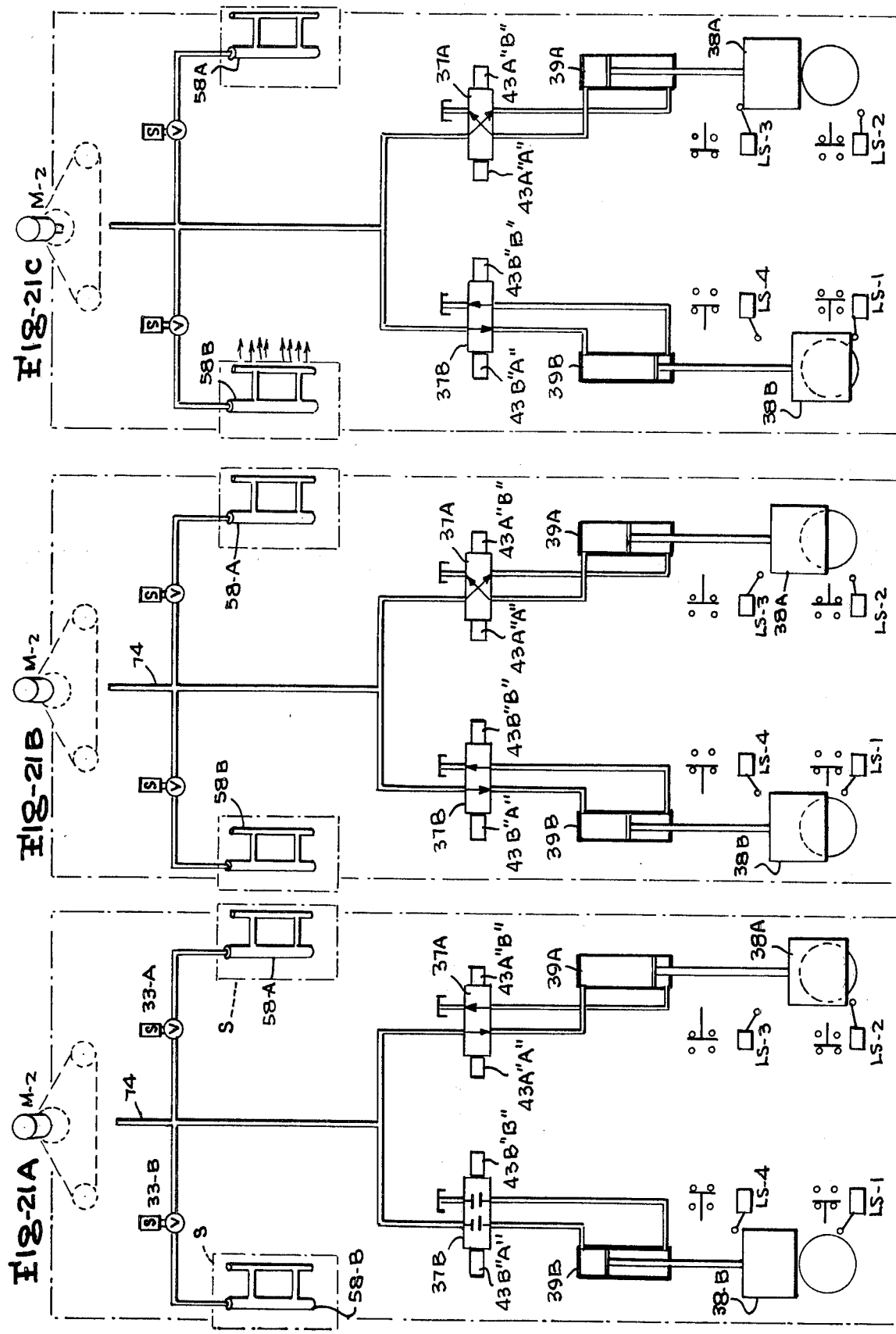

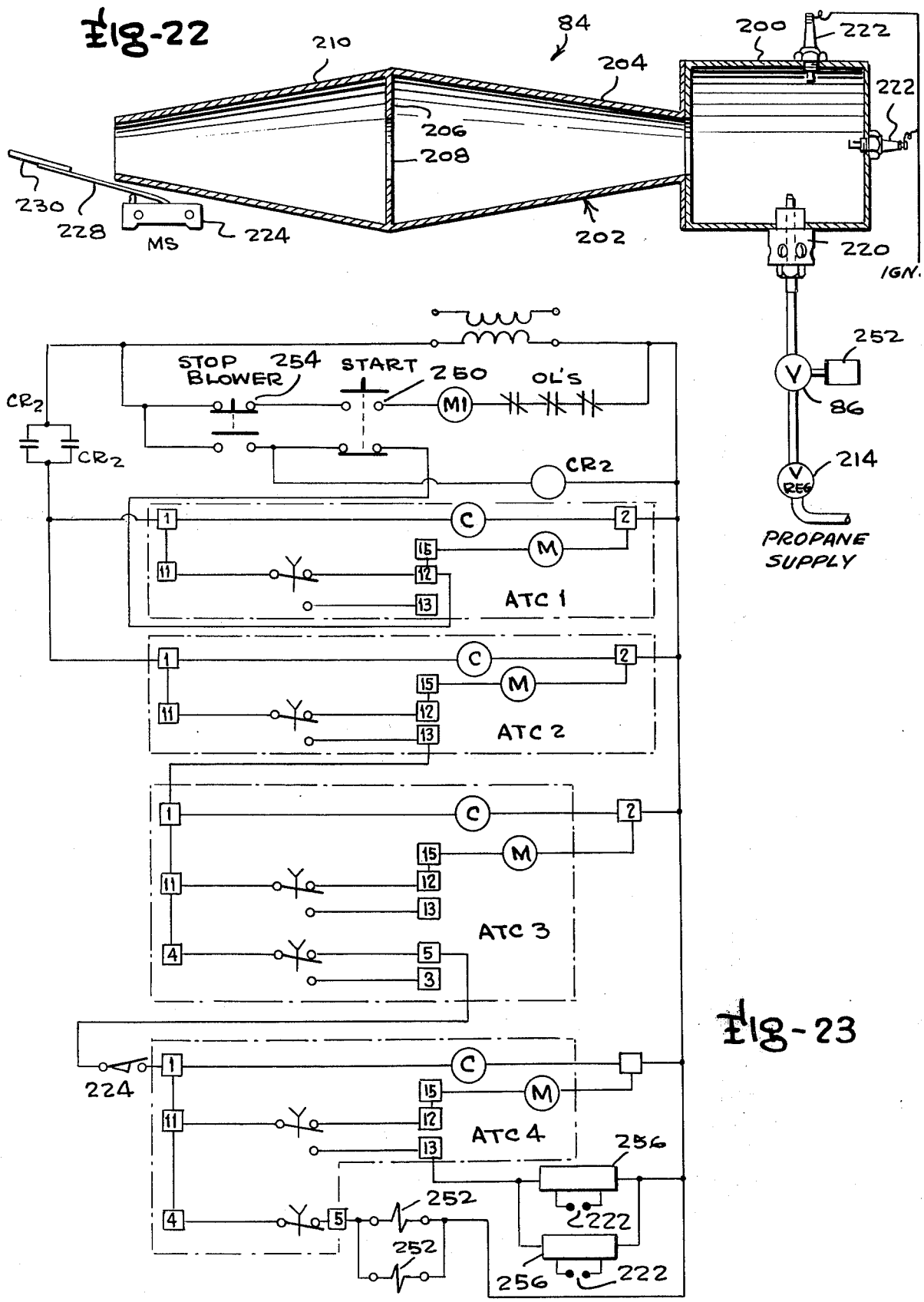

HIGH TEMPERATURE AIR FILTRATION SYSTEM AND METHOD FOR FOUNDRIES

BACKGROUND OF THE INVENTION

This application is a continuation-in-part of our earlier application Ser. No. 284,582 filed Aug. 29, 1972, now abandoned.

The present invention relates to an improved high temperature filtering system for continuously filtering and cleaning the effluent exhaust gases emitted by various manufacturing facilities including cupola furnace installations with effluent gas temperatures reaching 2,000°F., and which emit quantities of submicron sized particulate material among particles which may range in size from 0.2 to 1,000 microns. Most conventional filtering systems have been effective in filtering particles as small as only 5 to 10 microns in size. Systems effective on smaller sized particles have been unable to attain the required flow rate. An example of the need for exceptionally large flow rates is found in the firing operation of a cupola type furnace, during which approximately 30,000 standard cubic feet per minute of air flow through the furnace attendant the melting of twenty-five tons of material per hour.

Prior art bag filter type systems have been provided which were limited to a maximum flow rate of 20 cfm per square foot of filter media area, while reducing to perhaps 4 cfm after becoming substantially clogged. Very large units which must be field erected are caused by the low filtration flow rates which results in high installation costs. With a maximum flow rate of 20 cfm per square foot of filter media area, only certain particles can be filtered. For metallurgical fumes, maximum flow rate is 2 to 3 cfm per square foot of filter media area. Conventional glass fiber type filter bags are usually effective and usable in temperatures of less than 550°F. Above 550°F. the filters are destroyed by excessive heat and therefore are not suitable for installation with cupola furnaces where temperatures frequently reach 2,000°F. Additionally bags have a one to two year life expectancy due to the bags susceptibility to moisture temperature, cutting, pin holes and abrasive material. The high cost of intalling new bags makes the fabric bag type filters expensive to maintain.

The well known cyclone type agglomerators have relatively high flow rates, but are limited in effectiveness to eliminating particles of approximately fifteen microns or larger. Other usable filtering systems include the venturi scrubber type, the variable pressure drop scrubber type, and the wet collector orifice type. These filtering systems either have limited effectiveness in removing particles smaller than ten microns in size or otherwise suffer from excessively high installation costs. Some of these systems require water settling ponds or exceptionally large quantities of water to prevent orifice clogging. Exceptionally high horsepower requirements, fabrication and field erection costs and high operating costs make many of these systems uneconomical and ecologically undesirable.

Electrical precipitators have previously been used; however, they are extremely sensitive to fluctuations in gas flow and temperature and additionally are expensive to install.

Other prior art filter systems have vertically reciprocating jet or vacuum nozzles for cleaning selective rows or banks of filter units, particularly the flat type units, as they become clogged. Many of these prior art systems include a flexible hose which extends into the filter unit area during the reciprocating travel of the cleaning nozzles and cannot be used in high temperature systems for which the present invention is designed. Others systems embody movable vacuum cleaning nozzles which are ineffective, or which cannot operate at a maximum temperature of 2,000°F. without damage to the filter media or other components.

SUMMARY OF INVENTION

Our present invention provides an improved filtering system and related apparatus which effectively removes more than 98% of the submicron particles at filtration velocities of 100 to 700 cfm per square foot of filter area.

Accordingly, it is a principle object of the present invention to provide a system which more effectively filters smaller particles and has sufficient air flow through the system filtering media to provide efficient operation of manufacturing facilities which require exceptionally large air flow.

Further, our present invention provides improved self-cleaning rotary sweeping nozzles for each filter unit through which a pressurized cleaning fluid is jetted at high velocities from nozzles vertically disposed on the clean air side of a temporarily bypassed or shunted filter unit. The jet of cleaning fluid dislodges the accumulated particles from the opposite side of the reinforced cylindrical screening.

Cleaning is initiated automatically when a predetermined velocity drop through the screen media is detected and is accomplished quicker than in the previously mentioned systems. In our improved system using a composite cylindrical filter screen unit having a diameter of 1½ to 3 feet and a height of 20 to 40 feet, the approximate cleaning time is 3 to 20 seconds depending on the clogged condition. Preferably, a four filter unit module will have 1½ feet diameter filters and a two filter unit module will have 3 feet diameter filters, therefore, the filtration capacity would be identical for units of the same height. Furthermore, a two unit module of the larger diameter will cost less while providing the same filtration capacity.

It is therefore, an additional object of our invention to provide improved automatic jet nozzle type cleaning mechanisms for quicker cleaning of filter media mounted in modular cylindrical sections of a frame which prevents buckling or collapsing of the filter screen media when clogged with particles. Additionally, the frame may be made sufficiently flexible to permit alternative vibration cleaning imparted by combustible fluid explosion shock wave units or by mechanical vibrator units. The jets of pressurized fluid directed against said screens will also impart vibrations to the filter screen media.

A further object of the present invention is to provide improved longer life cylindrical modular filters which permit composite assembly with like filters to produce a screen assembly of predetermined size adapted to dry type filtration systems and when combined with a jet nozzle cleaning mechanism using compressed air or steam as the cleaning fluid are capable of operating effectively at temperatures as high has 2,000°F. without damage to the filter media. If damage occurs, the modular assembly permits replacement of small sections of the filter media instead of an entire screen unit. These filters may be cleaned by shock-waves, vibrations or mechanical scrubbing.

Still another object of the present invention is to provide an improved particle collection system of a reduced size capable of cleaning a flow of gases in excess of 50,000 cfm and having components which may be fabricated and shipped to a job site in assembled unitary sections. The overall dimensions of the assembled unitary sections do not usually exceed 8 by 8 by 40 feet exclusive of the exhaust blower resulting in reduced costs of field installations.

These and other objects are achieved by the provision of a plurality of filter modules each embodying a large housing chamber mounted on suitable supporting framework. The large chamber is divided into at least two separate air tight compartments having one or more of the composite cylindrical filters constructed of joined modular sections. Each cylindrical filter has a self-contained cleaning mechanism and each pair of air tight compartments will be exhausted by an exhaust blower. In a system having several of the housing chambers, one or more of the compartments can be filtering the effluent gases while others are being cleaned.

These and other objects and advantages will become more apparent from the following detailed description, considered in conjunction with the illustrative drawings exemplifying certain embodiments and major components of our invention.

BRIEF DESCRIPTION OF THE DRAWINGS

FIG. 1 is a perspective view of the preferred embodiment showing a plurality of air filtering modular units connected in parallel with an effluent gas conduit connected to an optional cyclone precleaner agglomerator.

FIG. 2 is an enlarged side elevational view of a modular filtering unit;

FIG. 3 is a fragmentary view taken along line 3—3 of FIG. 2, and shows access doors to the compartments of the filter modular unit;

FIG. 4 is an enlarged top view taken along line 4—4 of FIG. 2 and shows four drive units (two in each of two compartments) for the screen cleaning mechanism, and the air supply conduit;

FIG. 5 is an elevational view of a filtering screen unit assembled by joining cylindrical modular sections;

FIG. 6 is an enlarged fragmentary elevational view showing a rotary cleaning mechanism for the cylindrical screen unit of FIG. 5;

FIGS. 7 and 8 are cross-sectional detail views through the screen cylinder as taken along lines 7—7 and 8—8 respectively of FIG. 5;

FIGS. 9 and 10 are further enlarged cross-sectional detail views taken along lines 9—9 and 10—10 of FIG. 5;

FIG. 11 is a fragmentary view of one of the cleaning nozzles taken along line 11—11 of FIG. 6;

FIG. 12 is an enlarged sectional view taken along line 12—12 of FIG. 6 through the central pipe lateral arm and manifold nozzle thereof;

FIG. 13 is an elevational view of an alternative embodiment of the present invention showing a central feed pipe with a plurality of longitudinally spaced nozzles for cleaning the screen unit;

FIG. 14 is a fragmentary detail view showing the connection of the fluid cleaning supply conduit with the central feed pipe;

FIGS. 17 and 18 are elevational and top plan views of an alternative embodiment also having a single cylindrical screen filtering unit in each of two compartments, and embodying shock wave generators in place of the rotary nozzles on each filter cylinder of the unit to shock wave clean the filters;

FIG. 19 is a detail view taken along 19—19 of FIG. 18;

FIG. 20 is a wiring diagram showing the electrical control circuits incorporating the rotary cleaning mechanism of FIG. 6;

FIGS. 21A, 21B, and 21C are composite wiring and pneumatic diagrams illustrating a sequence of bypassing a clogged filter unit to a standby filter to permit cleaning of the clogged filter unit and to provide continuous air filtering by the system;

FIG. 22 shows a fragmentary elevational view of an embodiment of the shock wave generator generally shown in FIG. 17; and FIG. 23 is a wiring diagram showing the electrical control circuit incorporating the shock wave generator of FIG. 22.

DETAILED DESCRIPTION OF A PREFERRED EMBODIMENT

Figure 15:
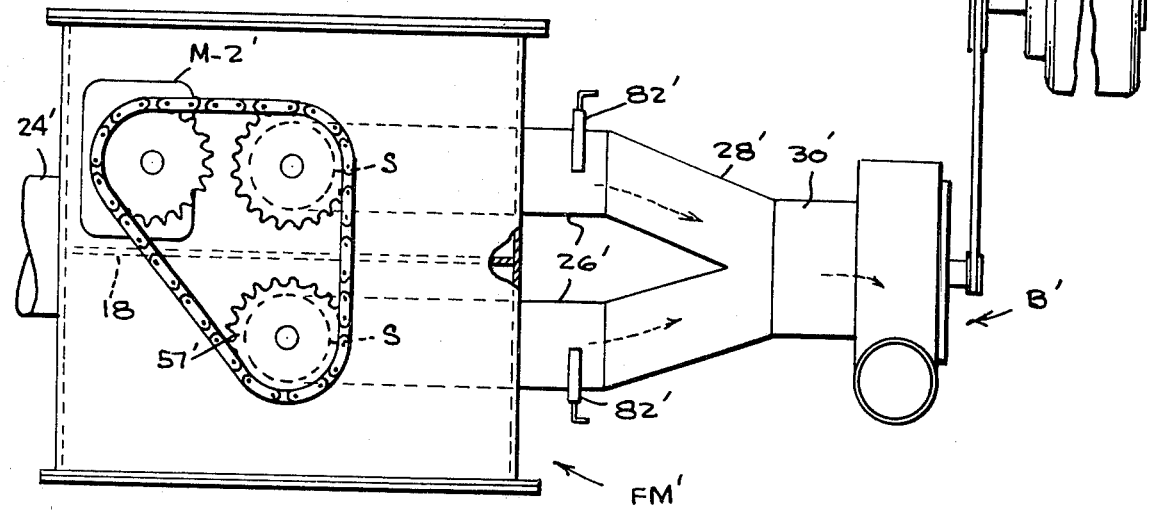
FIGS. 15 and 16 are top plan and side elevational views of an alternative embodiment of the present invention having a single cylindrical screen filtering unit in each compartment of the unit.

Referring now to the figures, the same reference characters will designate the same parts throughout the different figures.

In FIG. 1 there is shown an agglomerator A which which may perform initial pre-cleaning filtering for the particle-laden effluent gases flowing through exhaust conduit C from any potential air polluting installation, such as a cupola type smelting furnace. The agglomerator A may be of the cyclone type, which removes particles larger than 50 microns and then discharges the particles into a suitable collection means. The gases are drawn from the agglomerator through a transfer duct D and into a plurality of filter modules FM by means of individual exhaust blower B. Each filter module FM has a plurality of vertical cylindrical screen units S and cleaning mechanisms CM generally centrally contained therein and to be described in detail herein. The transfer duct D is of the manifold type having branch conduits for coupling with each filter module. The exhaust blowers B are, in turn, connected to dampered exhaust stacks E to direct the clean gases into the atmosphere. While plural filter modules have been shown in FIG. 1, unless the effluent gases exceed approximately 50,000 cfm, only a single filter module would be required.

More specifically, the filter modules FM shown in FIGS. 2, 3, and 4, are designed to provide economical final stage cleaning of both low and high temperature gases, the latter usually being in the range of from 300° F. to 2,000° F., such as may be emitted from cupola type smelting furnaces. Each filter module FM includes an elongated, rectangular sheet metal housing forming an enclosed chamber designated generally at 10 having a generally flat top wall 12, rigid vertical side walls 14 and terminating at its lower part in a solids-collecting hopper portion 16. Chamber 10 is divided vertically by separating wall 18 to form two separate gas-input and solids-collecting compartments 20 and 22, shown in FIGS. 3 and 4. Each compartment contains at least one of the cylindrical screen units S.

In the preferred embodiment, each of the compartments 20, 22 is provided with a pair of the cylindrical filter screen units S, as shown in FIGS. 1 and 3. The screen units S are shown of substantially smaller cross-sectional area than each of the compartments 20 and 22; however, the screen units may be of various diameters. Branch conduits 24 of the transfer duct D are sufficiently large to accommodate the maximum required flow of gases and are connected in an airtight manner with an inlet aperature 25 bisected by the separating wall 18 (FIGS. 3 and 4) and positioned in a sidewall of the chamber 10 to supply an equal flow of gases to both compartments 20 and 22. The velocity of the incoming gases flowing from the branch conduits 24 is substantially reduced by the larger cross-sectional area of each compartment. This decrease in velocity allows the larger particles to settle by gravity to the collection hopper 16. Accordingly, it is unnecessary to embody a separate agglomerator A in the system, and the conduit C (FIG. 1) can connect directly with the transfer duct D. The remaining particles leaving the agglomerator are removed from the effluent gases by the various filter modules FM which constitute exhaust or output chambers for the gas flow. The two filter screen units S of each compartment, to be described in detail hereafter, are shown connected at their lower ends in a parallel manner with an exhaust duct 26 which emerges generally horizontally from a side wall of the hopper 16 and preferably at the side of the filter module FM opposite the branch input duct 24. While the filter screen units S are shown connected at the lowermost ends, the connection could be intermediate the ends if a different arrangement is desired. The exhaust ducts 26, 26 emerging from each chamber are connected by a Y-shape fitting 28 with an enlarged duct 30 whose cross-section is sufficient for the output from both compartments as both may operate simultaneously. Said conduit 30 is connected to the intake side of the exhaust blower B.

Proceeding now to a more detailed description of the filter screen units S, reference will be made to FIG. 5 through 10. Each unit S includes, as shown in FIG. 5, a plurality of open cylindrical frame sections 32 covered with suitable woven wire screen 34, preferably screen sandwiched filter media to constitute modular sections of predetermined length which may be fastened together end-to-end to achieve the desired height of the unit. The filter modules FM and the frames may be constructed of iron or other suitable materials depending upon the gaseous products being filtered. Each section 32 includes a pair of spaced-apart end bands 36, one of which may be common to two adjacent sections, and may include an intermediate ring 38 spaced therebetween. The bands or rings are joined together by a plurality of circumferentially spaced, longitudinally extended rods 40, (See FIGS. 5 and 7) which are structured to support the filter media and resist deformation of the latter when subjected to the jet flow from the cleaning mechanism manifold to be described hereafter. Sections 32 have only one end band 36 and one intermediate band 38, with the aforesaid rods 40 projecting beyond band 38 for the desired length to be subsequently welded to the adjacently disposed end band 36 of the next section. In this manner the end bands 36 are common to two adjacent assembled sections. Where the sections are made with separate end bands 36, the end bands may be of lesser width because the abutting end bands of adjacent sections may be fastened together in any suitable manner such as butt welding, or by the use of circumferential overlying straps of a width to overlay the abutting end bands 36. The overlying straps could then be fastened to the end bands 36 by means of a plurality of peripheral bolts extending radial from the end bands and through the overlying strap. Alternately the end bands 36 could be provided with external annular flange portions which are peripherally bolted in an axial direction.

The assembled frame has the sections 32 covered with corresponding lengths of the filter media 34 which are wrapped tightly around the open framework and secured in an overlapping manner, as shown in FIGS. 9 and 10. This facilitates ease of initial assembly and subsequent ease of replacement of the screen and filter media sections 34 which may become damaged or worn. The overlapping edges are preferably separated by a strip of gasket filter media 42 and are fastened by screws 44 to a rigid mounting strap 46 which is used in this intermediate area in lieu of one of the rods 40. The gasket may be eliminated for certain air filter media. At opposite ends of the sections 32, the filter screen media 34 is supplementally held circumferentially against the end bands 36 by circumferentially applied straps 48 which are of sufficient width to clamp and hold the sections 32 in their assembled end-to-end manner when each section is made with individual end bands 36. The straps 48 as shown in FIG. 10 are similarly gasketed as at 50 and bolted.

The rotary cleaning mechanism CM of each screen unit S, as shown in FIGS. 3 and 6, includes an elongated hollow, tubular header pipe 56 through which the cleaning fluid is supplied and which is journalled axially and centrally within said screen unit S with suitable drive pulley and belt means 57 for effecting rotation about the axis thereof. A range of rotating speeds for the header pipes 56 is between 3 and 20 RPM. Preferably, a single drive motor and gear reducer unit M-2 is used to rotate the header pipes of all of the screen units within a common chamber 10. Suitable controls direct cleaning fluid into the clogged unit when cleaning is required. In this manner, initial installation costs are reduced because fewer parts are required which reduces potential service costs.

A plurality of individual hollow cleaning manifolds or nozzles 58 corresponding in length and number to the sections 32, are mounted parallel to the header pipe 56, each on a pair of laterally projected hollow, fluid-conducting support arms 60, 60 which extend from header pipe 56. The manifold pipes 58 are disposed closely adjacent the inner periphery of the filter media 34. Longer or shorter manifold pipes could be used if desired. Further, while the respective nozzles 58 are shown in vertical alignment, some alternate arrangements may provide either a spiral or alternating offset disposition. Each manifold 58 is provided with a pair of vertical slots 62 in the outermost radial face (FIGS. 11 and 12) through which a cleaning fluid is directed under high pressure. The cleaning fluid passes through the screen and filtering media 34 to clean the accumulated particles from the outer surface of the filtering media. Alternatively, in place of the narrow slots 62, a plurality of apertures and/or nozzles of the type shown generally in FIG. 13 may be utilized.

The bearing means for journalling the central header pipe 56 include a solid stub axis shaft 64 shown in FIG. 6 closing off the lower end of pipe 56, and having a lower bearing assembly 66 fixedly attached on cross-arm angle supports 68 and in which bearing the stub shaft 64 is rotatively mounted. A similar upper bearing means 70 is mounted on a suitably reinforced filter end plate 72 which has a central opening to allow passage of the header pipe 56. Reference to FIGS. 1 and 14 will show the manner in which a stationary cleaning media supply pipe 74 may be sealingly connected to the upper end of rotatable header pipe 56. The supply pipe 74 may be connected with any suitable commercially available flexible hose capable of conducting steam or compressed air. One such hose is known as the Goodyear Flexsteel 250 steam hose.

It is understood that a suitable swivel type connection between the supply pipe 74 and central feed pipe 56 is airtight or leakproof while providing the required relative rotation of the central header pipe 56. Any suitable source of cleaning fluid such as air, steam or water may be connected with pipe 74.

Returning to the cleaning manifold, FIG. 12 represents an enlarged cross-sectional detailed construction of a typical configuration found to be satisfactory, as taken substantially on line 12—12 of FIG. 6.

Preferably, the cleaning manifolds 58 are in close proximity to the filter media 34, however, there may be installations where considerably smaller diameter screen filtering units S are used and it may be advisable to omit the lateral arms 60 and manifolds 58, and provide the central pipe 76, as shown in FIG. 13, with a plurality of axially spaced nozzles 78 through which steam or other cleaning fluid may be directed to clean the screen unit 80. It is also understood that similar type nozzles might be used in place of the vertical slot 62 on the header manifold 58.

BRIEF OPERATION SUMMARY

A brief review of the filter cleaning operation will now be described and hereafter expanded to include the pneumatic and electrical schematics of FIGS. 20 and 21A, B and C. Blower unit B must first be manually started before the filtering and cleaning system can be activated. To clean a filter screen unit S, one of the air operated blast gate type valves 82 shown in FIGS. 4 and 15 located in each leg of the Y-shaped fitting 26 between the expansion compartments and the exhaust fan B will be closed to prevent gas flow through the compartment and screen S. After the blast gate 82 has been closed, the filter cleaning mechanism CM will be activated to direct the cleaning fluid through the rotating manifolds 58 to clean the filter media of the entrapped particles. The manifolds 58 are driven by motor and gear reducer unit M-2 including an appropriate train of drive pulleys or gears and the corresponding drive pulley or gear 57. The filter cleaning manifold will rotatively operate between approximately 3 and 20 RPM for approximately 3 to 20 seconds. A suitable timer device will deactivate the drive motor and close valves which supply the cleaning fluid and then the cleaned filter screen S can be activated by opening the blast gate 82 to permit the gases to flow through the filter. Alternatively, the filter screen unit can be placed on standby until the adjacent filter compartment becomes sufficiently clogged with particles after which suitable controls will reintroduce the previously cleaned screen unit into operation and clean the clogged unit by a similar cycle.

DESCRIPTION OF FILTER MEDIA

The filter media used for the filter screen units S is preferably composed of layers of metal fibers from 4 to 25 micron diameter sintered between two layers of stainless steel screen. For applications where gaseous emissions are in the range of 500° F. or below, 304 stainless steel fibers and screen layers should be used. In instances where the temperature may range from 500 to 1,400° F., Driver Harris 242 alloy or equivalent should be used. The filter media will have an efficiency of greater than 98% on particles down to the 0.5 micron size at filtration velocities of 100–700 cfm per square foot of filter area. The filter material is rated at 10.0–13.6 rayls. It is also understood that woven metallic wire filters may be used. One form of filter media may be the Brunscoustic Accoustical (10 rayl) panel type which uses 4 to 25 micron fibers. This Brunscoustic filter media is available from the Brunswick Corp. and is usable at filter velocities of 100–1,000 cfm per square foot of media area, depending upon the fiber diameter and particulate removal requirements. Some of the Brunscoustic or Brunsmet filter media is rated for maximum temperatures of 1,400° F. Additional higher temperature media has been developed which will withstand severe temperatures up to the 2,000° F., as previously mentioned. An example is the filter media manufactured by the National Standard Corp., Woven Products Division, under the tradename "DURAMESH," which product is covered by U.S. Patent No. 3,502,116.

VARIOUS CLEANING MODES

The filter media additionally may be cleaned of the entrapped particles by reverse air, steam and water jets, by shock waves or mechanical vibration to be described and further by mechanical scrubbing with rotating brushes.

The reverse air jet cleaning method preferably requires a supply of 80 PSI compressed air. The compressed air is piped to the series of cleaning manifolds which rotate about the vertical axis as previously described. The compressed air is discharged through the slots of the manifolds with the air jet flow directed from the clean side to the clogged side of the filter media to dislodge and blow the accumulated particles away. The particles normally form a thick layer which is usually removed from the filter media in sizable agglomerated fragments which will settle into the hoppers located in the bottom part of the filter module FM.

The reverse steam jet method will require a source of steam at 125 PSIG and will operate in the same manner described previously for reverse air jet cleaning except the steam is discharged through a series of nozzles 78 as shown in FIG. 13.

Where a reverse water flushing is used, it is the same as the steam jet method except water replaces the steam.

A further mode of cleaning is accomplished with shock waves generated in various ways to impart sufficient velocities to the gases within the filter screen units to dislodge the accumulated particles from the exterior of the filter media as the gases are forced through the filter. An illustrative system will be described hereafter in conjunction with FIGS. 17, 18 and 19.

Figure 16:
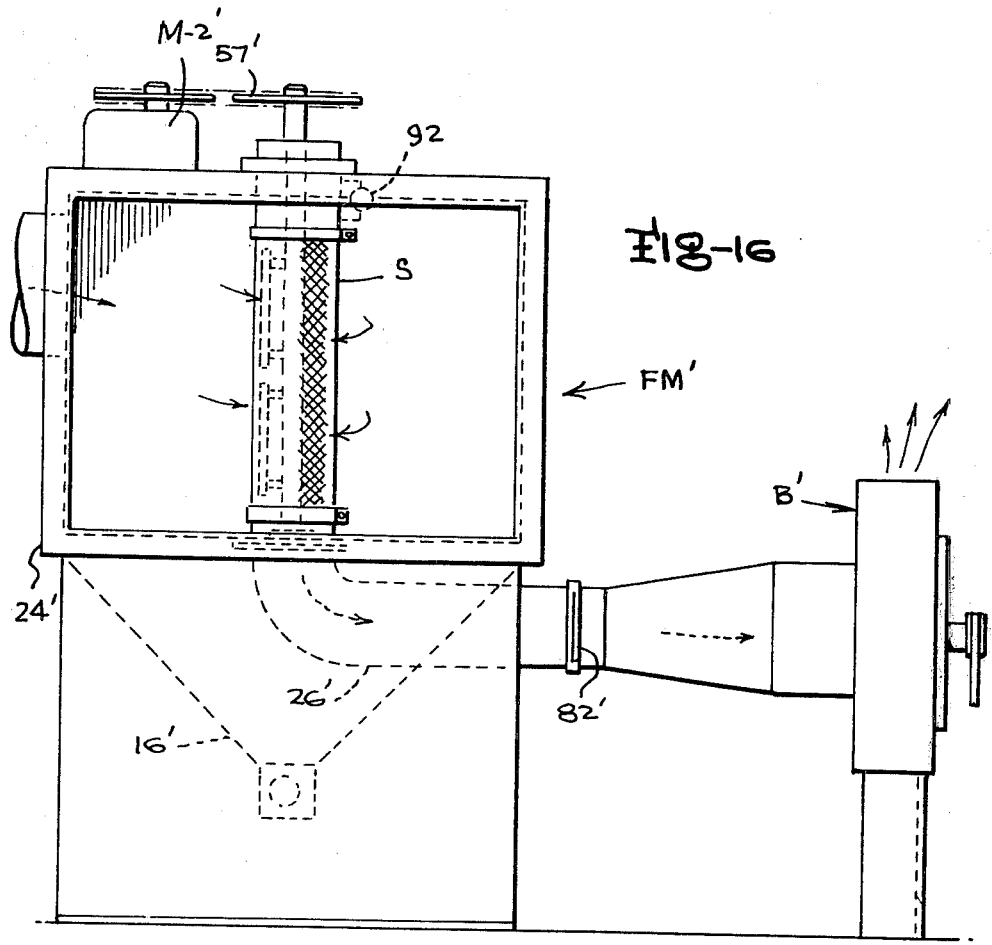

Mechanical vibration cleaning of the particles from the filter media may be achieved by positioning a mechanical vibrator, designated 92 in FIG. 16, at one or both ends of the filter screen unit S to vibrate the filter media and dislodge the accumulated particles collected in the hopper 16.

The traveling brush type of cleaning (not shown) could be effected by a suitable attachment of traveling brush means to suitable guide rails adjacent filter units S whereby the brush fibers will be in contact with outer surface of the filter media. As the brush travels over the filter media, it will wipe the accumulated particles from the filter media. Suitable chain or cable drive means may be used to power the movable brushes.

ALTERNATIVE EMBODIMENTS

Returning to FIGS. 15 and 16, there is depicted a second embodiment of the present invention in which the filter module FM' has but one filter screen unit S' in each of the two compartments divided by wall 18'. In these figures corresponding primed reference numerals are used for designating parts corresponding to the first embodiment.

In the first embodiment as well as in this second embodiment, the filter units S can be operated singly or in any number in parallel to provide the desired filtration.

Referring to FIGS. 17 through 19, the same type filter module FM'' is shown in an embodiment utilizing propane gas explosion sonic shock wave generators 84 connected at both the top and the bottom of the filter units S''. The shock wave generators 84 are inserted into the clean gas side of the filter units, to generate sufficient gas expansion from within the filter units to dislodge the deeply embedded particles on the exterior of the filter media. The particles become more deeply embedded in systems of this type when very high filtration velocity is being used, and therefor require substantially higher forces for removal. For example, a filter unit 3 feet in diameter and 20 feet tall has 190.4 cubic feet of volume and removal of the accumulated particles requires a reverse jet flow of 6,000–8,000 cfm. Sonic shock wave removal must compress the gases in the filter cylinder sufficiently to obtain this velocity and may require compressing the contained volume of gas in the filter by 10,000 times or more. Many prior art compressed air shock wave devices utilize the air shock to impart vibration to the filters to break up the accumulated particles rather than by high velocity of the gases therein.

When one of the filters reaches a predetermined clogged condition, appropriate detection such as the Annubar switch hereafter described, activate the cleaning cycle whereby valves 86 will be electrically activated to release propane gas from a gas storage tank 92 into the shock wave generators 84 where the gas is ignited. The resulting explosion in one or preferably both shock wave generators at the same instant causes a sonic wave which rapidly compresses the gases in the filter unit S'' and forces them from the interior clean side of the filter through the filter media to the particle covered side at sufficient velocities to dislodge the accumulated particles. The electrically operated gas valves 86 then automatically close after one additional explosion of the residue gas is ignited to assure removal of all accumulated particles from the particular filter unit. After the last explosion, the filter unit is placed on standby to be reconnected into the system when the other unit becomes clogged to a predetermined extent. The screen units S'' are provided with suitable explosion or pressure relief means such as gravity closable hinged doors 88 and inclined stop bars 90 as shown in FIG. 19 which assure reclosing of the doors by gravity.

The shock wave generators 84 may use various combustible fuels including propane, acetylene or natural gas and are preferably enclosed by suitable housings 85 to deaden the noise created by the explosions.

Our preferred embodiment of the shock wave generator 84 as shown in FIG. 22, includes a cylindrical combustion chamber 200 communicating with an outlet section 202 comprising a divergent conical segment 204 separated by an orifice plate 206, having a central cylindrical opening 208, from a convergent conical exhaust nozzle segment 210 which communicates with the interior of the filter unit S'' as shown in FIG. 14. Fuel is supplied from a storage tank 92, through a pressure regulator 214 to the feed solenoid valve 86 and into an air-fuel mixer 220 such as used with conventional gaseous fuel burners. Ignition is provided by conventional spark plugs 222 which extend into the combustion chamber 200 and are activated by the electrical control system described hereafter.

A normally closed time delay limit switch 224 mounted adjacent exhaust nozzle 210 has an actuation lever 228 with a deflection vane 230 attached to the end of the lever at a small angle relative to the flow of exhaust gases from exhaust nozzle segment 210. The vane 230 is spring biased into the flow path of the exhaust gases and deflects away from the flow whenever the shock wave generator is fired. When the exhaust gases stop flowing from the exhaust nozzle segment 210, the vane 230 returns to its original position and after time delay of the time delay limit switch 224, the shock wave generator may again be fired as described hereafter.

Other types of shock wave generators which are commercially known and available include those sold under the trademark names of "Scarecrow" and "Thunderbird" respectively by the B. M. Lawrence and Co. of San Francisco, California and the Reed-Joseph Co. of Greenville, Mississippi. Additional types of controlled explosions may be created to effect the same type of shock wave cleaning.

The filter modules FM may be preassembled in a factory for shipment to the field as needed. Additionally filter modules may include either initially or subsequently attached corner-support legs 92 as shown in FIG. 1 which extend up the full height of the unit to rigidly support the module at a predetermined height above the ground or other support surface. As shown in FIG. 3, the filter module is provided with a pair of access doors 94 to permit access to the two intake-expansion chamber portions of the filter module in which the screen units S are disposed. A platform 96 with railing and ladder access means 98 is also preferably provided with each module.

With respect to the exhaust blower B, a damper unit 99 as shown in FIGS. 1 and 2 is attached to the exhaust outlet thereof at its connection with the exhaust stack E. The damper unit 99 may be of any suitable type whether of the solid disc or plate type or plural movable vanes constituting the necessary damper means and may be actuated either manually or automatically by suitable controls provided in a known manner.

DETAILED OPERATIONAL SEQUENCE

Following is a detailed description of the operational sequence of the first embodiment as shown in the wiring diagrams in FIGS. 20 and 24 and schematics of FIGS. 21A, 21B and 21C with reference to prior art systems.

Various known negative or vacuum pressure flexible bag type and similar particle collector units of the intake or expansion chamber type have been known and adapted to be connected to the intake duct carrying the effluent gases. These units embody an exhaust chamber connected to an exhaust fan to create a vacuum in the filter unit which draws the particle laden gases from the pollution source into the collector unit and through the filter bag media to remove many of the particles. In the large filter bag units, it has been common practice to divide the units into a number of separate compartments, with usually one or more of the compartments being in operation for filtering the effluent gases, and at least one compartment being shutdown for cleaning as necessary when the detected pressure drop in one of the operating compartments reaches a preset pressure drop. These systems place the cleaned compartment back into operation for filtering the effluent gases. This method is used in the known filter bag units and is accomplished by using differential pressure switches monitoring the pressure drop across the filter.

When the pressure differential reaches a preset pressure, the differential pressure switch will send an electrical signal to an electrical control system when the filters are clogged and must be cleaned, whereupon the electrical control activates a valve switch which places the spare filter compartment in operation while shutting down the clogged filter compartment and automatically starting the cleaning cycle.

Our improved system shown in the electrical and pneumatic schematics of FIGS. 20, 21A, 21B and 21C provide protection means to indicate a clogged condition such as a predetermined pressure drop across the filter of 5 p.s.i. When this condition is indicated, a standby filter unit is connected in parallel to operate concurrently while related control means stops the flow of gases to the clogged filter unit.

The improved system therefore includes and provides a control circuit which monitors and activates various components in the filter system including the cleaning mechanisms CM, when a predetermined clogged condition such as a reduced velocity flow or increased pressure differential across the filter media is detected.

The electrical schematic of FIG. 20 identifies the various electrical components of the system including appropriate solenoids, relays, limit switches and the like in a manner readily understood by one versed in the art. Some of the relays, motors and timers are shown as circles identified by letters X, XI, Y, YI, Z, MI, TD1, etc. While other parts of the schematic will have contacts controlled thereby correspondingly identified by the appropriate reference letter. On the left of FIG. 20 are schematic diagram reference numerals which are referred to as Lines in the following discussion and which locate the contacts of the various relays and timers as shown by the numerals under the captions on the right of FIG. 20. The operational sequence is initiated by energizing the exhaust blower B through operation of switch means 100 (line 1 of the schematic). Suction created within the filter module draws the particle laden gases from the pollution source through the filter module. The larger particles fall into the hopper 16 of the module as reduced velocity of the gases is insufficient to suspend the particles. The gases then pass to the filter media of the screen unit to extract most of the remaining fine particular material whereupon the clean gases pass through the exhaust blower B and exhaust stack E into the atmosphere.

For convenience of identification, the schematic of FIG. 20 refers to compartments A and B which are equivalent to compartments 20 and 22 of the filter module. Some of the schematic components have reference characters including an A or a B to identify the particular component as connected to or excluded from the compartment A and B.

In time the filter media 34 collects sufficient particulate matter to restrict the air flow through the filter. Devices sold under the name Annubar, embody a monitoring pitot tube mechanism for detecting the flow of gases through a duct or tube. These devices can be connected in a well known manner with switch devices to affect controls in accordance with predeterminable conditions. When the flow of gases is restricted in chamber B to a predetermined extent, an Annubar switch PS-1 (FIG. 20) is activated to control a three way valve 37A (FIGS. 21A, B and C) which supplies compressed air to retract the piston in the air cylinder 39A (FIGS. 21A, B and C). This retraction will open the blast gate 38A (corresponding to blast gate 82 in FIGS. 1 and 2). Limit Switch-3 will control three way valve 37B which supplies air to air cylinder 39B to close the blast gate 38B. After the blast gate 38B is closed, Limit Switch-1 will activate the cleaning mechanism drive motor M-2 and open air solenoid valve 33B which permits compressed air in air supply pipe 74 (FIGS. 14, 21A, B and C) to flow through the filter cleaning manifold 58 and jet through the slot 62 in the manifold. The jetted air will flow through the filter media to dislodge the accumulated particles on the outer surface of the media. The dislodged particles drop into the hopper 16 at the bottom of the filter module and are discharged into suitable containers by a motor operated discharge valve not shown and located in the bottom on the hopper.

After the filter cleaning manifold has operated for approximately 3 to 20 seconds, the timer TD-2 will deactivate the cleaning mechanism drive motor M-2 and close the solenoid valve 33B. The cleaned filter unit S located in compartment B is then placed on standby until the corresponding filter unit located in compartment A becomes clogged and needs cleaning whereupon the cycle will be repeated including the detection of relative clogging.

Before starting the cleaning cycle, the blast gate 38A associated with compartment A is closed, the blast gate 38B associated with compartment B is open, and the normally open contacts of limit switch LS-2 (lines 17, FIG. 20) are closed and normally closed contacts (line 7) are open, and the normally opened contacts of limit switch L.S.-3 (line 28, FIG. 20) are opened. A peak timer TD1 and the clean cycle timer TD2 are reset and deactivated and all solenoids 33A, 33B, 37B and 37A are in neutral condition. The system would be set in a similar manner if the system is to be started with gate 38B closed.

Switch means 100 (line 1, FIG. 20) energized the blower M-1 starter relay which closes the normally open auxiliary contacts on M-1 (line 2, FIG. 20) thereby energizing the control circuit. The normally closed contacts of limit switch L.S.-1 (line 3, FIG. 20) associated with compartment B, will then energize relay A-1 (line 3) through a closed contact (line 3) on relay X and also energized relay B-2 (line 5) through a closed contact (line 4) on the relay Y thereby energizing the solenoid on three way valve 43A to move down blast gate 38A and the solenoid on three way valve 43B to move up blast gate 38B. This position remains until the filter screen S becomes clogged and needs to be cleaned.

If the pressure switch PS-1 senses a predetermined drop in velocity across the sensing element it will close and energize the timer TD-1 (line 11, FIG. 20), although if the velocity is only a peaking situation, PS-1 will open again and the timer will not time out or close contacts on the timer TD-1 (lines 13 and 15). If the timer TD1 reaches the set time and the pressure switch PS-1 is still closed, the cleaning cycle will be initiated. The normally open contacts (line 13 and 15 on FIG. 20) of the timer TD-1 will close thereby energizing the cleaning cycle timer TD-2 and closing a normally open contact of timer TD-2. The relay X (line 17) is energized through the limit switch LS-2 (line 17) thereby closing the normally open contacts (line 18) of relay X to energize the relay X-1 (line 18). Relay X is deactivated when the timer TD-2 times out and opens the normally open contacts on line 17; thereby energizing the shifting cycle and cleaning cycle. The normally closed contacts of relay X (lines 3 and 8) open to deenergize relay A-1 which deenergizes the down solenoid 43A"A" on three way valve 37A and the normally open contact (line 9) of relay X closes energizing relay A-2 (line 9) which energizes up solenoid 43A"B" on three way valve 37A thereby raising blast gate 38A. The normally open contacts (line 18) of relay X close to energize relay X-1 (line 18) which is the cleaning relay. As the blast gate 38A starts up, the limit switch LS-2 (line 7) closes and energizes the relay B-1 which, in turn, energizes the solenoid 43B"A" thereby lowering blast gate 38B to a closed position. When blast gate 38A reaches the top, limit switch LS-3 (line 28) is closed energizing solenoid 33B (line 28) and starting the cleaning drive motor M-2. When the clean cycle timer TD-2 times out, its normally closed contacts (lines 11 and 17) close and the normally open contacts (line 17) open to deenergize relay X and X1 to stop the cleaning cycle. When the B compartment is cleaned and the A compartment needs cleaning the blast gate 38B will be closed and the pressure switch PS-1 will shift back automatically and complete another cleaning cycle.

Provision is made for manually initiating the cleaning cycle if necessary or desired. This is achieved by operating the automatic/manual selector switch 102 (lines 23 and 28) and also depressing the manual clean switch 104 (line 24) which energizes the relay Z and closes the normally open contacts on lines 19, 22, 30 and 32 thereby energizing the relays X-1 and Y-1, solenoids 33A and 33B and the cleaning drive motor M-2 (line 30) to thereby effect blowing of air through the air jet manifolds as the manifolds are rotated to clean the filters as in the automatic cleaning cycle. Opening selector switch 102 and clean switch 104 stops the manual clean cycle.

When the system is in a start position as shown in FIG. 21A the blast gate 38A associated with compartment A is closed and blast gate 38B is open therefore filtering is occuring in compartment B. When the filter unit S of compartment B is clogged to a predetermined extent, the detection and control means initiates connection of compartment A with its filter screen unit into the filtering system. Accordingly, FIG. 21B shows the interim changing step of bringing the filter unit S of compartment A into simultaneous operation with compartment B, as blast gate 38B is raised and blast gate 38A is lowered. Figure 21C shows compartment B and its cleaning units isolated from the flow of gases by blast gate 38B whereby the filter unit in compartment A serves to continuously filter gases during the isolation and cleaning of the filter unit S in compartment B.

The foregoing description shows that a predetermined number of filter units S may be connected or disconnected to filter the effluent gases depending upon the detected reduced flow conditions through each filter unit. The various portions of the control circuit shown in the FIGS. 20 and 21A, B and C and associated with the respective compartments and filter units can be duplicated and interrelated as required for each of the filter modules within an overall system.

The preferred embodiment of the shock wave generators 84 as shown in FIG. 22 may be activated by a control system as shown in FIG. 23.

To start the filtering of air in the filter unit S'', the blower start push button 250 is depressed which energizes the magnetic starter M-1 to activate the motor on the exhaust blower B.

In our preferred embodiment with the shock wave generators 84, cleaning is accomplished by positioning generator 84 at each end of the filter unit S'' as shown in FIG. 17. Each generator 84 is filled with a propane gas and air mixture which is ignited by the spark plugs 222 when a gas pulsing timer ATC-4 shown in FIG. 22 times out. The timers used in FIG. 23 are the ATC timer which is manufactured by the Automatic Timing Company of King of Prussia, Pennsylvania. The timer ATC-4 controls the length of the time solenoid 252 hold valve 86 open and is adjustable for a mild or intense explosion. In the preferred embodiment, 4.5 seconds results in a medium explosion. If too long a length of time is set on gas pulsing timer ATC-4, flame out will occur with little or no explosion. Reducing the timer on gas pulsing timer will allow normal operation.

Operation of a clean cycle is initiated by depressing the blower stop button 254 which will deenergize the blower magnetic starter M1 and energize relay CR2 which starts the filter cleaning process. When the cleaning cycle relay CR2 is energized, normally open contacts CR2 are closed which energizes a total cleaning time timer ATC-1 and a motor roll out timer ATC-2. The total cleaning time timer is adjustable and is set at approximately 11.5 minutes. The motor roll out timer ATC-2 is used as a delay to assure that the blower B has stopped rotating before the shock wave generators 84 are activated. The motor roll out timer ATC-2 times out in approximately 10 minutes and energizes the gas pulsating timer ATC-3 through terminal 13 on ATC-2. Simultaneously, the solenoid timer ATC-4 is energized through the time delay limit switch 224 which is normally closed and the gas valve solenoids 252 are activated to admit fuel through the gas valve 86 into the combustion chamber 200 through fuel air mixer 220. When ATC-4 times out, solenoids 252 are deenergized stopping the flow of fuel and the ignition transformers 256 are energized through terminal 13 of the gas solenoid timer ATC-4 which creates a spark on spark plugs 222 to ignite the fuel air mixture in the combustion chamber 200. The contacts on time delay switch 224 are opened by the exhaust gases flowing past vane 230 and will not close until the exhaust gases stop flowing out of the exhaust nozzle 210 and the set time delay have occured. When time delay switch 224 again closes, the gas pulsing timer ATC-4 starts another ignition cycle. The ignition cycle will continue until one of the following occurs:

1. The gas pulsating timer ATC-3 times out at 56 seconds to provide a back up safety device with low operation time;
2. the cleaning cycle timer ATC-1 times out at 11 minutes;
3. or the blower start button 250 is depressed which deenergizes the cleaning cycle relay CR2.

It is apparent that the improved system for filtering the final stages of effluent gases achieves the objectives and advantages set forth in the preamble of the specification.

The advantages of the present invention over prior systems includes the ability of the filter media to function effectively at temperatures from ambient to 2,000°F. with a filter life as high as 50,000 hours or more. The filter media may be cleaned with air, water, steam, vibration, shock wave and travelling brushes as desired. The improved rotating manifold disposed within the cylindrical filter configuration permits cleaning the filter media with air, water, and steam fluids. The disclosed means achieving cleaning without the need for flexible hoses, hose reels, travelling manifolds or other types which would be adversely affected when subjected to the high temperatures.

This improved system permits faster cleaning of the filter media and reduces the cost of cleaning mechanism. The system provides a high gas flow to filter area ratio of from 100 to 700 cfm per square foot of filter area while removing over 98% (percent) of submicron size particles. The filter media is normally non-combustible except possibly for the particles agglomerated on the outer surface of the filter. The module lends itself to the installation of a sprinkler system or other extinguisher system without any danger of damaging the filtration system. Low installation costs result because the units with the exception of the exhaust blower and wiring can be shipped as a preassembled operating unit. Such units may measure 8 x 8 x 40 feet but usually will not exceed 40 feet in height. No precooling of the effluent gases is reqired unless the temperature of the gas stream exceeds 2,000°F.

Considerably reduced operating and maintenance cost in comparison with the venturi type scrubbers and variable pressure drop scrubbers result from the elimination of pumps, nozzles and other mechanical equipment. Lower electrical power consumption results from the higher pressure drop requirements in previous systems to obtain the same efficiency. Eliminating the settling ponds further reduces installation and operating costs. In some installation of our system, it may be feasible to employ a steady spray of water on the filter media from the rotating manifold to provide scrubbing of a portion of the gases from the effluent gas stream. Reduced maintenance cost compared to the fabric collection filter media results because the present filter assemblies last four times longer than the previous fabric filters. The space requirements and foundation costs are less than required for the fabric filter units.

Numerous modifications of the subject invention will undoubtedly occur to those of skill in the art.

For example, the cross-sectional diameters and overall lengths of the filter screen units S may be widely varied. Additionally, the above described cleaning cycle with the shock wave generators can be incorporated in an automatic control system as previously described for the rotary cleaning mechanism to be actuated by an Annubar pressure switch PS-1 thereby providing an automatic cleaning cycle while maintaining the filtering of effluent gases through the filter modules. Therefore, it should be understood that the spirit and scope of the invention is to belimited solely in light of the appended claims.

We claim:

1. Improved air filtering apparatus more particularly for final stage filtering of particles from a flow of high temperature effluent gases, comprising in combination:
   (a) at least one elongated upright filter module having rigid walls defining an enclosed housing with an intermediate vertical wall dividing said housing into two substantially identical filtering compartments constituting combined gas expansion and solids-collecting chambers, said housing having inlet means for directing the flow of effluent gases into the filtering compartments, an outlet means for discharging the flow of effluent gases from each filtering compartment in the atmosphere, said compartments each being of substantially greater flow area than the inlet flow area means to permit expansion of the gases and reducing the velocity of the larger particles which fall by gravity into a collection zone at the bottom of said housing;
   (b) filter assemblies including at least one hollow cylindrical filter unit, said filter unit including a rigid open cylindrical framework, a plurality of individual filter pieces of wire screen removably attached to said framework and sized to circumferentially cover said cylindrical framework and completely cover the full length of said cylindrical framework, said filter unit corresponding essentially to the major length of an disposed generally centrally within each of said two filtering compartments, said flow of effluent gases passing from the filtering compartments through the exterior of said filter units and into the interior of said filter unit; conduit means for connecting the interior of said filter units respectively with said housing outlet means; said filter units also constituting exhaust chambers for the cleaned gases; and blast gate means in said conduit means for selectively isolating one of said filter units as a standby unit to receive the effluent gases when a predetermined clogging of said other filter unit is detected;
   (c) exhaust blower means having an outlet means to the atmosphere and having an inlet connected with said filter unit exhaust chamber and with the housing outlet means and having sufficient capacity to draw the effluent gases through said housing and said filtering assemblies individually at predetermined high velocities to cleanse said gases, thereby returning cleaned gases through the housing outlet means to the atmosphere;
   (d) said filter units further including substantially self-contained filter-cleaning means for removing particles which accumulate on the filter media;
   (e) detecting means operatively disposed in said respective filtering compartments for detecting a predetermined velocity drop through said respective filtering units which is caused by clogging of the filter units which limits the flow of gases through the compartments;
   (f) electrical circuit and control means operatively connecting said detecting means with means forming part of said control means for automatically initiating a concurrent operation of said standby filter unit when said predetermined velocity drop is detected to effect and maintain filtering operation within the filtering system thereby maintain continuous operation of the filtering apparatus; closing the flow of effluent gases to the clogged filter unit; and activating said cleaning means to clean said clogged unit ior subsequent filtering when another of said filter units becomes similarly clogged.

2. Apparatus as defined in claim 1 wherein said cleaning means include fluid dispersing means movable about the axis of said cylindrical filter units and with fluid dispersing nozzle means in close proximity to but spaced apart from said cylindrical screen units for directing a cleaning fluid from the clean gas side of the filter unit through and toward the particle laden effluent gas side to remove accumulated particles from said cylindrical filter units.

3. Apparatus as defined in claim 1, wherein said exhaust blower means is disposed downstream of said filter module.

4. Apparatus as defined in claim 1 wherein each of said conduit means are connected with ducts which merge into the outlet means for facilitating the operative connection of the interior of the filter units to said exhaust blower means.

5. Apparatus as defined in claim 1 wherein said filter module is of generally square horizontal cross-sectional configuration; said module further including structural supporting legs connected to corners of said module to support the module a predetermined distance above a support surface and access doors provided in each of said compartments thereby facilitating initial construction and subsequent servicing of said module.

6. Apparatus as defined in claim 1 wherein said filter module is fabricated to dimensional limits which may be factory assembled except for said exhaust blower means and control means, thereby providing a filter module capable of facilitating shipping in essentially completed form.

7. Apparatus as defined in claim 1 further including distribution means for connecting a plurality of said filter modules in both serial and parallel manner with one another to provide a final stage filtering system.

8. Apparatus as defined in claim 1 wherein said cleaning means include mechanical vibration means attached to and near one end of said filter units for imparting repeated mechanical vibration at predetermined intervals to the filter unit to dislodge said accumulated particles from said filter unit.

9. Apparatus as defined in claim 1 including means for connecting said cleaning means to a pressurized source of a cleaning fluid taken from the group consisting of air, water, and steam.

10. Apparatus as defined in claim 1 wherein said filter units are rigid and have outlet means connected in parallel with said exhaust blower means.

11. Apparatus as defined in claim 1 wherein said plurality of said filter pieces are of a predetermined length to constitute modular filter media sections which are interchangeable and replaceable on any section of the cylindrical framework.

12. Apparatus as defined in claim 1 wherein said filter pieces circumferentially overlap and include gasket means disposed between said overlapped area for insuring gas tight fastening of said filter pieces to said framework.

13. Apparatus as defined in claim 1, wherein said framework comprises a plurality of open cylindrical sub-sections of predetermined length to form modular units from which the filter unit of varying length or height may be fabricated according to filtering needs; and include means for rigidly securing said sub-sections together in end-to-end relation.

14. Apparatus as defined in claim 13, wherein said filter pieces are of axial length to correspond to the length of said sub-sections.

15. Apparatus as defined in claim 1, wherein said framework is generally of uniform circular cross-section and said filter media forms smoothly arcuate inner surfaces adjacent said framework; said cleaning means for cleaning said filter unit includes fluid-supplying header pipe with associated bearing and drive means for rotating the header pipe on the axial center of said filter unit, said header pipe having a plurality of hollow manifold nozzles supported on transverse hollow support arms interconnecting said nozzles with said header pipe, with said manifold nozzles disposed vertically and adjacent said filter media's arcuate inner surface, and through which support arms cleaning fluid is communicated to said nozzles which have fluid-passing openings in the radial outermost side for directing cleaning fluid under pressure to clean accumulated particles from said outer surface of said filter unit.

16. Apparatus as defined in claim 15 wherein said plural manifold nozzles have vertical lengths corresponding substantially to the vertical length or extent of said filter pieces.

17. Apparatus as defined in claim 1 wherein said filter pieces are disposed in essentially end-to-end adjoining relation forming juncture lines therebetween when covering said framework, and wherein the means for fastening said cover pieces to said framework include circumferential straps tightly overlaying said juncture lines and end-most portions of each adjoining pair of said filter pieces.

18. Apparatus as defined in claim 17 wherein said filter pieces are of a size to circumferentially overlap for the means for fastening said filter media pieces further include removable fasteners holding free end portions of said straps substantially together, and other removable fasteners inserted through said overlap seam and secured into a rigid fastening member comprising part of the skeletal framework.

19. Apparatus as defined in claim 1 wherein said cleaning means include a combustible fluid shock wave generator means for generating and imparting sudden very high compression to the internal gases within said filter units thereby imparting sufficient velocity to said internal gases to drive said gases through and effectively clean said filter units.

20. Apparatus as defined in claim 19 wherein said combustible fluid shock wave generator means comprises a propane gas-fired generator unit disposed at one end of each filter unit for directing a shock wave interiorly of said filter unit.

21. Apparatus as defined in claim 19 wherein said combustible fluid shock-wave generator means comprises propane gas-fired generator units disposed at opposite ends to each filter unit to provide sonic shock-wave induced explosions interiorly of said filter unit from both ends, and said filter screen units have pressure relief means embodied therewith to preclude damage to said screen units by said shock-wave explosions.

22. Apparatus as defined in claim 21, wherein said pressure relief means include hinged door members and door stop members disposed in a manner slightly inclined to form an acute angle relative to a normally closed position thereof so that said pressure relief doors open generally upright to abut said stop members and said doors reclose by gravity.

23. Improved air filtering apparatus especially efficient for final stage filtering of high temperature, pollutant-laden, effluent gases, comprising in combination:

(a) at least one elongated upright filter module having rigid wall means defining an enclosed housing with an intermediate vertical wall dividing said housing into two substantially identical filtering compartments constituting combined gas expansion and solids-collecting chambers, said module having inlet opening means for connecting a flow of pollutant particle-laden gas therewith for passage therethrough, and so as to divide the flow into substantially equal amounts when entering said respective compartments, said compartments each being of substantially greater cross-sectional area than that of said inlet opening means for said gas flow to provide for gas expansion and reduced velocity precipitation of larger pollutant particles which fall by gravity into a collection zone of said module and said module having outlet means for ultimately discharging to atmosphere the flow of gas leaving each filtering compartment;

(b) filter assemblies including at least one rigid hollow cylindrical filter unit corresponding essentially to the major length of and disposed generally centrally within each of said two filtering compartments; means connecting said filter units respectively with said module inlet and outlet means; said filter units also constituting exhaust chambers for the cleansed air; and selective valving means connected at least in said outlet means of said module for effectively isolating one of said filter units as a standby unit to be introduced into filtering function with the gas flow upon detecting a predetermined velocity drop through said other filter unit which indicates clogging of said other filter unit;

(c) exhaust blower fan means having an outlet means to the atmosphere and having an inlet connected with said filter unit exhaust chambers and said module outlet means and having sufficient capacity for moving said exhaust gases generally from the pollution source through said module and said filtering assemblies individually and concurrently at predetermined high velocity as may be required to cleanse said gases, thereby facilitating returning cleansed gases to the atmosphere;

(d) said filter units further comprising a plurality of rigid modular open skeletal and cylindrical frame sub-sections detachably secured together in end-to-end open-center fashion to comprise a filter unit frame of predetermined length; and a plurality of pieces of screen filter media in flexible sheet form of predetermined lengths removably applied over and fully covering said secured-together skeletal cylindrical frame sub-sections to facilitate ease of original assembly and any subsequent servicing replacement; and said filter assembly units further including rotatable manifold type cleaning means disposed within the filter unit exhaust chamber in non-touching engagement with and adjacent the interior of said filter units for cleaning each unit;

(e) velocity change detecting means operatively disposed in said respective filtering compartments for detecting a velocity drop of at least one predetermined extend of the gas flow through said respective filtering units upon their becoming clogged to a certain degree;

(f) electrical circuit and control means operatively connecting said detecting means with means forming part of said control means for automatically initiating operation of said selective valving means to close off from the exhaust flow the filtering unit detected as ineffective by the particle accumulation clogging thereof, said electrical circuit means completes operative withdrawal of said affected clogged filter unit to be cleaned from said operating system, and activates said cleaning means to clean said unit and recondition it for subsequent filtering use when another of said filter units becomes similarly clogged, and said electrical circuit means effects and maintains filtering operation of said other filter unit of said other compartment within the filtering system to maintain continuous operation thereof.

24. In a filtering system, a method of filtering suspended particles from high temperature effluent gases leading from a source of pollution comprising the steps of:

(a) providing fluid communication between a plurality of prefabricated, mutually independent, dual chambered filter modules having plural filter units therein, in parallel with one another and to a flow of said gases and providing an exhaust gas outlet for discharging the flow of effluent gases from each filter unit to the atmosphere;

(b) disposing an exhaust blower fan unit in said exhaust gas outlets and connecting said therewith to draw the effluent gases from the source through the system;

(c) selectively establishing operation of at least one of said filter module chambers and one of said filter units therein into the system during filtering operation, while reserving one of said filter units for standby operation;

(d) controlling flow of said gases through the respective filter unit in the chamber which is filtering including:

(1) detecting a predetermined velocity drop through said operating filter unit which is caused by clogging of the filter unit which limits the flow of gases through the compartment then (2) initiating filtering operation of said other standby filter unit into concurrent operation with said operating filter unit, and (3) isolating said operating filter unit from the flow of effluent gas in the system, then (4) cleaning the clogged filter unit by substantially self-contained cleaning means associated therewith for selective reuse in filtering within the system when subsequent detecting establishes a need for reintroducing said the cleaned filter unit into the system.

25. A method as defined in claim 24 wherein the cleaning step includes backflushing the filter units to remove accumulated particles therefrom by rotating manifold nozzles about the axis of the cylindrical filter units, subsequently collecting the removed particles and periodically discharging the particles into suitable discharge means associated therewith, stopping the automatic cleaning step after a predetermined period of time thereby providing a cleaned filter unit for subsequent operative connection to the system as may be required.

26. A method as defined in claim 24 wherein the cleaning step includes imparting a substantial shock wave into the interior clean gas side of the filter units to highly compress the gases therein and force said gases outward at sufficient velocities to dislodge the accumulated particles from the exterior side of the filter units.

27. The method as defined in claim 26 wherein said sonic shock wave cleaning step further includes imparting simultaneously exploding propane gas-generated shock waves from opposite ends of said filter units.

28. The method as defined in claim 24 further including and following said imparting of said shock waves from opposite ends, the step of generating one additional explosion of any residue propane gas to supplementally contribute to the cleaning of said filter unit.

* * * * *